No. 783,663. PATENTED FEB. 28, 1905.
H. W. ALDEN.
TOWING SYSTEM.
APPLICATION FILED FEB. 8, 1900.
2 SHEETS—SHEET 1.
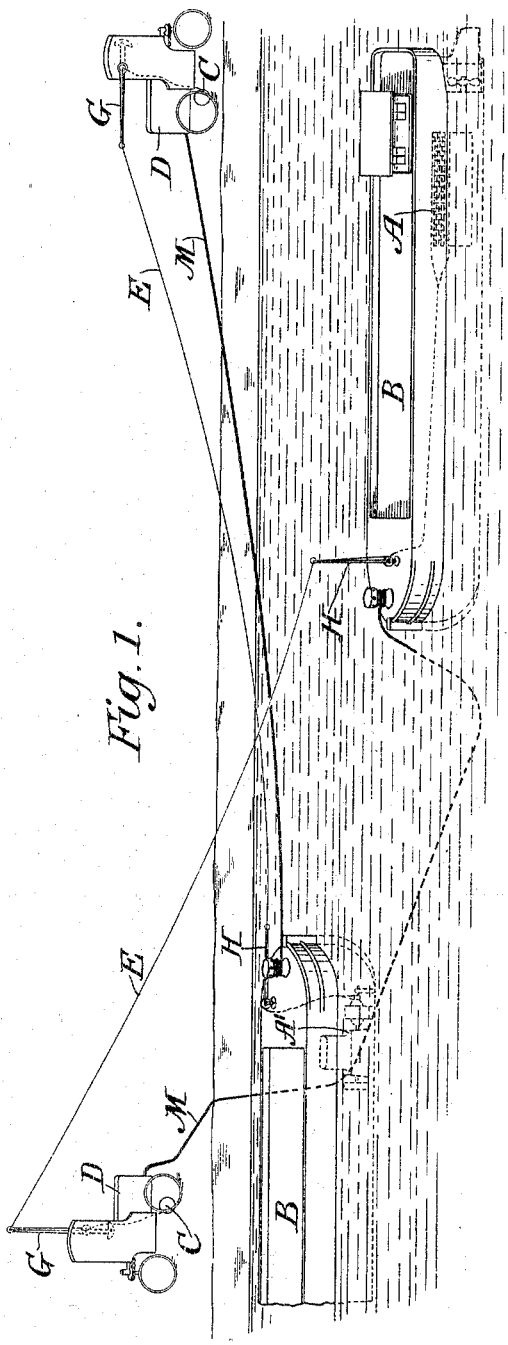
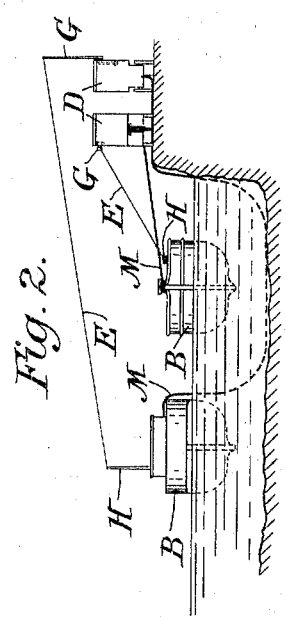
Attest:
Inventor:
Herbert W. Alden
by Redding, Kiddle & Greeley
Attys No. 783,663. PATENTED FEB. 28, 1905.
H. W. ALDEN.
TOWING SYSTEM.
APPLICATION FILED FEB. 8, 1900.
2 SHEETS—SHEET 2.
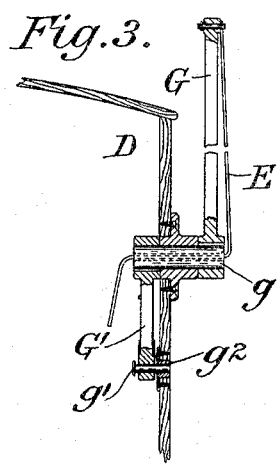
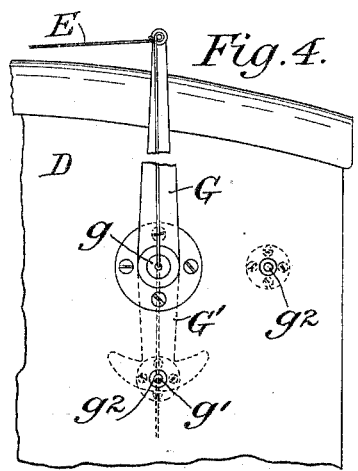
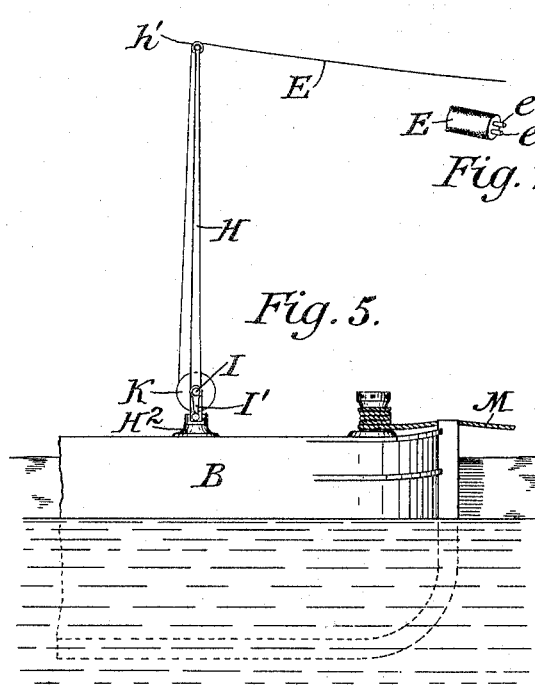
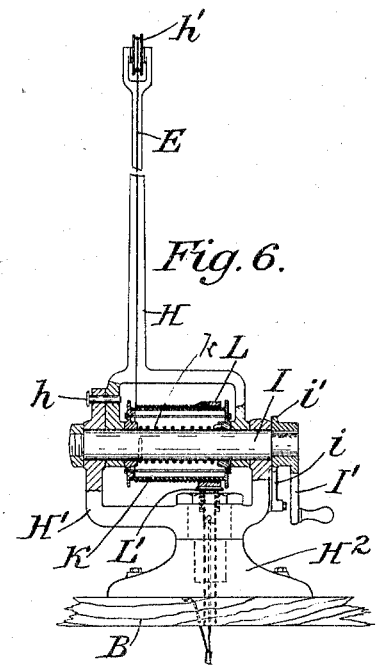
Attest:
Inventor:
Herbert W. Alden
by Redding, Kiddle & Greeley
Attys.

No. 783,663.                                                            Patented February 28, 1905.

UNITED STATES PATENT OFFICE.

HERBERT W. ALDEN, OF HARTFORD, CONNECTICUT, ASSIGNOR, BY MESNE ASSIGNMENTS, TO MORTON TRUST COMPANY, TRUSTEE, A CORPORATION OF NEW YORK.

TOWING SYSTEM.

SPECIFICATION forming part of Letters Patent No. 783,663, dated February 28, 1905.

Application filed February 8, 1900. Serial No. 4,472.

*To all whom it may concern:*

Be it known that I, HERBERT W. ALDEN, a citizen of the United States, residing in the city of Hartford, county of Hartford, State of Connecticut, have invented certain new and useful Improvements in Towing Systems, of which the following is a specification, reference being had to the accompanying drawings, forming a part hereof.

This invention relates generally to such systems of towing boats through canals as employ electrical tractors or locomotives which run on the canal-bank and are connected with the boats by tow-lines. Heretofore it has been proposed to supply current to the motor of such a tractor by means of a trolley in contact with a continuous conductor; but the dependence of the tractor upon the continuous conductor and the cost of maintenance of such a system constitute practical objections to the general adoption of such systems.

It is the object of this invention to overcome the objections referred to and to provide an improved system in which the wheeled vehicle or tractor shall be wholly independent of any continuous conductor and in which the tractor shall retain its efficiency under all ordinary conditions of use regardless of the character of the road over which it travels, no track or metal way being required for the tractor to travel on nor to form a part of the electric circuit in which the motor is included.

A further object of the invention is to provide for the convenient manipulation of the electrical conductor and of the tow-line under all conditions, especially when boats are passing one another, and for the avoidance of any injury to the electrical conductor, such as would be caused by running the heavy tractor over it.

The invention will be more fully described hereinafter, with reference to the accompanying drawings, in which—

Figure 1 is a general view representing a portion of a canal with two passing boats and tractors. Fig. 2 is a transverse section of the same on a somewhat smaller scale. Fig. 3 is a detail view showing a portion of a tractor with its conductor-pole, said view being in transverse section. Fig. 4 is a side elevation of the same. Fig. 5 is a detail view, in side elevation, showing a portion of a boat with its conductor-pole. Fig. 6 is a detail view, on a larger scale, of the conductor-pole and reel shown in Fig. 5. Fig. 7 is a detail view of a two-wire conductor.

In accordance with the invention the electrical apparatus—such as a source of electric energy, whether a storage battery, as shown at A in Fig. 1, or a motor and generator, as shown at A' in Fig. 1—is carried by the boat B and is connected with the motor C of a suitable electric tractor or locomotive or wheeled vehicle D preferably by a complete or all-metallic circuit—that is to say, by a continuous conductor for each leg or side of the circuit. By preference both of these conductors $e$ and $e'$, as represented clearly in Fig. 7, are joined in a single conductor-cable E, the two separate conductors being suitably insulated. This manner of connecting the motor with the source of electric energy on the boat makes the tractor wholly independent of any prepared roadway, such as a track, requiring no electrical connection between the tractor and the ground on which it travels or the water of the canal. It is obviously desirable that the conductor should be independent of the tow-line M and be connected to the boat and the wheeled vehicle or tractor independently thereof, so that the two shall be capable of relative longitudinal movement at least to meet the requirements of the service and to prevent rupture or injury of the conductor under any and all conditions of the tow-line, as well as to promote convenience. As indicated above, it is desirable to provide special means or mechanical devices for the manipulation of the conductor, whether the same be a single conductor or a double conductor, not only for convenience, especially when boats are passing one another, but for the further purpose of avoiding injury to the conductor by permitting the wheeled vehicle or tractor to run over it as it lies upon the ground. It will be obvious that the tow-line and the conductor might be handled together; but as the tow-line is not particularly liable to injury by being run over it will be found more convenient to permit the tow-line to be handled in the usual manner, while the conductor alone is manipulated by the devices provided for that purpose. The means provided for manipulating the conductor should be such as to dispose the same in any position required by the exigencies of the service and particularly should be such as to raise it high enough to allow another boat or vessel to pass under it and should be capable of being lowered, so that the conductor shall be carried normally at such a height as to pass readily and without contact under low bridges, projecting limbs of trees, and other obstructions. Furthermore, the conductor should be kept under sufficient tension to prevent it from sagging too much, and provision should be made for taking it in or paying it out automatically, as well as by the intervention of an attendant, in order that it may accommodate itself to the distance between the boat and the tractor and with relation to the condition of the tow-line. Means for manipulating the conductor obviously should be carried both on the tractor and on the boat or vessel, while means for maintaining tension and for taking in and paying out the conductor, either automatically or by hand, may be most conveniently carried on the boat or vessel, where the weight, and especially the space required, will be less objectionable. As shown in Figs. 1, 2, 3, and 4, a movable arm G, preferably pivoted, is mounted on the tractor D and has the conductor secured at its end. As shown in Figs. 3 and 4, the arm is secured to a hub $g$, suitably supported in the side of the tractor, through which the conductor may pass to the inside of the tractor-body and thence to the motor. To the inner end of the hub $g$ is secured a short arm G', which is provided with a suitable latch or stop-pin $g'$ to engage one or another of suitable stops $g^2$ for the purpose of holding the arm G in the desired position. A somewhat similar movable arm H is carried on the boat or vessel B and is suitably supported so as to accommodate the direction of the conductor and to permit the conductor to be taken in and paid out and the proper tension to be maintained thereon. Accordingly the arm H may be pivoted upon a shaft I, which is carried by a yoke or frame H', the latter being swiveled upon a suitable base-piece $H^2$, so that the arm may be swung in any direction about a vertical axis. A stop-pin $h$ serves to retain the arm H in its elevated or depressed position, said pin engaging an extension or part of the yoke or frame H'. A pulley $h'$ may be mounted in the end of the arm H to permit the conductor to run freely. The end of the conductor is secured to a drum K, which is mounted on the shaft I, and is yieldingly connected therewith by a spring $k$ under tension, so that the conductor itself shall be kept at a proper tension and shall be automatically shortened or allowed to lengthen under varying conditions with relation to the tow-line. The shaft is provided with a suitable handle I', so that the conductor may be taken in or paid out by hand, as required, a pawl $i$ engaging a ratchet $i'$, which may be formed on the hub of the arm I', in order to maintain the proper tension on the conductor. If a two-wire conductor is employed, as herein described, one wire may be in electrical connection with the drum and thence through the frame to the base, from which connection to the source of energy may be made in the usual manner. The other wire may be in electrical connection with an insulated ring L on the drum, and a contact-plate L' may be mounted on the frame, but insulated therefrom, and the conductor-wire continued from such contact, through the center of the swiveling frame and the base, to the other side of the battery or generator. In this manner proper electrical connection is maintained at all times, while the conductor may be taken in or paid out, as desired.

When boats are passing one another, the tow-line M, which may be connected directly to the tractor and to the boat or vessel in the usual manner, may be slacked away, so as to permit the other tractor and the other boat or vessel to pass over it. The conductor, however, is elevated both on the tractor and on the boat or vessel, so as to permit the other tractor and boat or vessel to pass under the same.

It will be obvious that the invention can be embodied in other forms and constructions than those shown and described herein, wherefore the invention is not to be restricted to the particular form and construction shown and described.

I claim as my invention—

1. The combination of a boat, an electrical apparatus mounted on the boat, a wheeled vehicle, electrical apparatus mounted on the wheeled vehicle, a mechanical connection between the boat and the wheeled vehicle, an independent electrical connection between the electrical apparatus on the boat and the electrical apparatus on the wheeled vehicle, and means for manipulating the electrical connection independently of the mechanical connection.

2. The combination of a boat, an electrical apparatus mounted on the boat, a wheeled vehicle, electrical apparatus mounted on the wheeled vehicle, a mechanical connection between the boat and the wheeled vehicle, an electrical connection, independent of the mechanical connection, between the electrical apparatus on the boat and the electrical apparatus on the wheeled vehicle, and mechanical devices to take up and pay out the electrical connection automatically independently of the mechanical connection.

3. The combination of a boat, a source of electrical energy, a wheeled vehicle, an electric motor, a current-conductor from the source of energy to the motor, means for taking up and paying out the conductor, and means for maintaining electrical connection through the conductor from the source of energy to the motor while the conductor is being taken up or paid out.

4. In a towing system, the combination of a boat, a source of electric energy mounted on the boat, a tractor, an electric motor mounted on the tractor, all-metallic electrical connections from the source of energy to the motor and return, and means mounted on the boat or tractor for raising and lowering the electrical connections.

5. In a towing system, the combination of a boat, a source of electric energy mounted on the boat, a tractor, an electric motor mounted on the tractor, all-metallic electrical connections from the source of energy to the motor and return, and means for maintaining tension on said electrical connections as the distance between the boat and the tractor varies.

6. In a towing system, the combination of a boat, a source of electric energy mounted on the boat, a tractor, an electric motor mounted on the tractor, electrical connections from the source of energy to the motor, means for raising and lowering the electrical connections, and means for maintaining tension on said electrical connections.

7. In a towing system, the combination of a boat, a source of electric energy mounted on the boat, a tractor, an electric motor mounted on the tractor, an electrical conductor from the source of energy to the motor, an arm pivoted on the tractor or boat and having said conductor supported thereon, and means for maintaining said arm in elevated or depressed position.

8. In a towing system, the combination of a boat, a source of electric energy mounted on the boat, a tractor, an electric motor mounted on the tractor, an electrical conductor from the souce of energy to the motor, a movable arm mounted on the boat and supporting the conductor, and means to maintain tension on said conductor also supported on the boat.

9. In a towing system, the combination of a boat, a source of electric energy mounted on the boat, a tractor, an electric motor mounted on the tractor, an electrical conductor from the source of energy to the motor, means for raising and lowering said conductor, and a drum mounted on the boat for taking in and paying out said conductor.

10. In a towing system, the combination of a boat, a source of electric energy mounted on the boat, a tractor, an electric motor mounted on the tractor, a two-wire electrical conductor connected to the motor and mechanically connected to a drum on the boat for taking in and paying out said conductor, and separate electrical connections from the separate wires of said conductor to the source of energy.

11. In a towing system, the combination of a boat, a source of electric energy mounted on the boat, a tractor, an electric motor mounted on the tractor, a two-wire electrical conductor connected to the motor, a drum mounted on the boat and having the other end of said conductor mechanically connected therewith, one wire of said conductor being electrically connected with the source of energy through the frame of the drum, an insulated ring mounted on said drum and connected electrically with the other wire of the conductor, and a separate electrical connection from said ring to the source of energy.

This specification signed and witnessed this 6th day of February, A. D. 1900.

HERBERT W. ALDEN.

In presence of—
  H. P. MAXIM,
  HERMANN F. CUNTZ.